United States Patent [19]

Gulati et al.

[11] Patent Number: 4,629,657

[45] Date of Patent: Dec. 16, 1986

[54] BIAXIALLY ORIENTED POLYPROPYLENE FILM CONSTRUCTION FOR SPECIAL LAMINATION

[75] Inventors: Sujan C. Gulati, Schaumburg; Edward C. Enderle, Bartlett, both of Ill.

[73] Assignee: Enron Chemical Company, Rolling Meadows, Ill.

[21] Appl. No.: 449,165

[22] Filed: Dec. 13, 1982

[51] Int. Cl.$^4$ .......................... B32B 27/00; B32B 15/08
[52] U.S. Cl. ..................................... 428/461; 428/910; 428/511; 428/515
[58] Field of Search ................. 428/910, 515, 511, 461

[56] References Cited

U.S. PATENT DOCUMENTS

| | | | |
|---|---|---|---|
| 3,088,844 | 5/1963 | Hungerford et al. | 428/516 X |
| 3,194,872 | 7/1965 | Garner | 428/511 X |
| 3,285,766 | 11/1966 | Barkis et al. | 428/516 X |
| 3,442,687 | 5/1969 | Hagan | 428/516 X |
| 3,496,061 | 2/1970 | Freshour et al. | 428/516 X |
| 3,505,143 | 4/1970 | Haas et al. | 428/511 X |
| 3,519,531 | 7/1970 | James et al. | 428/516 |
| 3,823,747 | 7/1974 | Dembiak et al. | 428/515 X |
| 3,963,851 | 6/1976 | Toyoda | 428/910 X |
| 4,045,607 | 8/1977 | Swearingen et al. | 428/515 X |
| 4,051,280 | 9/1977 | Mellows | 428/516 X |
| 4,125,662 | 11/1978 | Weiner et al. | 428/214 X |
| 4,132,857 | 1/1979 | Scarola et al. | 428/516 X |
| 4,257,536 | 3/1981 | Hilmar | 428/516 X |
| 4,275,120 | 6/1981 | Weiner | 428/515 X |
| 4,335,175 | 6/1982 | Webb | 428/516 X |
| 4,360,550 | 11/1982 | Asabura et al. | 428/910 X |
| 4,363,841 | 12/1982 | Snow | 428/516 X |
| 4,407,874 | 10/1983 | Gehrke | 428/216 X |

FOREIGN PATENT DOCUMENTS

| | | | |
|---|---|---|---|
| 0030950 | 3/1980 | Japan | 428/516 |
| 0133959 | 10/1980 | Japan | 428/516 |

*Primary Examiner*—Nancy A. B. Swisher
*Attorney, Agent, or Firm*—Donald F. Haas

[57] ABSTRACT

A film construction is disclosed which comprises a base layer of biaxially oriented polypropylene, a top layer of a copolymer of ethylene and an unsaturated carboxylic acid, and a bottom layer selected from the group consisting of copolymers of ethylene and an unsaturated acid, copolymers of ethylene and propylene, copolymers of ethylene and vinyl acetate, and ionomers of ethylene and methacrylic acid.

8 Claims, No Drawings

BIAXIALLY ORIENTED POLYPROPYLENE FILM CONSTRUCTION FOR SPECIAL LAMINATION

BACKGROUND OF THE INVENTION

The present invention relates to film construction wherein biaxially oriented polypropylene is utilized as the base layer. More specifically, the present invention relates to a film construction which is useful as shielding in the manufacture of coaxial and other transmission and communication cables and also in the manufacture of flexible packaging materials.

In the past, such film constructions have been made by utilizing a base layer of a material such as polyethylene terephthalate and coating each side of the base layer with an adhesive material. After coating, aluminum foil or some other material can be bonded to the film construction by means of the adhesive layers. The present invention provides a new construction which has sufficient strength and toughness (biaxially oriented polypropylene provides structure and toughness as does polyethylene terephthalate) without the use of adhesive materials and which can be formed by a one-step thermal lamination process which is simpler and less expensive than the two-step coating method described above.

SUMMARY OF THE INVENTION

The present invention relates to a film construction comprising a base layer of biaxially oriented polypropylene, a top layer of a copolymer of ethylene and an unsaturated carboxylic acid, and a bottom layer selected from the group consisting of copolymers of ethylene and an unsaturated carboxylic acid, copolymers of ethylene and propylene, copolymers of ethylene and vinyl acetate, and ionomers of ethylene and methacrylic acid. In a preferred embodiment, the top layer of the film construction is bonded to metal or paper. In another preferred embodiment, the bottom layer is a copolymer of ethylene and an unsaturated carboxylic acid and is bonded to metals, such as aluminum and copper. In a highly preferred embodiment, one or both of the outer layers are made of ethylene acrylic acid copolymer.

DETAILED DESCRIPTION OF THE INVENTION

The film construction of the present invention is basically comprised of a base layer and two outer layers. The purpose of the base layer is to provide the film construction with strength and toughness. The outer layers also provide some strength and toughness but their primary purpose is to promote the adhesion of the film construction to other materials such as metals like aluminum, or paper. Such articles of manufacture are useful in the coaxial and shielding cable industries and also in the flexible packaging industry. In addition, the outer layer of copolymer of ethylene and an unsaturated carboxylic acid provides desirable bonding properties (particularly when corona treated) for lacquer and acrylic based coatings, adhesives, and inks, used in the flexible packaging industry.

The base layer of the film construction of the present invention is comprised of biaxially oriented polypropylene. This material gives the film structure sufficient strength and toughness (machine direction tensile strength above 15,000 psi and transverse direction tensile strength above 25,000 psi) which is lacking in metal foils and papers. The biaxially oriented polypropylene core provides the integrity to prevent damage during fabrication and/or final application. The biaxially oriented polypropylene layer can be made according to any of a variety of well known processes which will not be discussed herein in detail.

One of the outer layers of the film construction (the top layer is chosen herein for convenience) must be comprised of a copolymer of ethylene and an unsaturated carboxylic acid. Again, methods for manufacturing such polymers and films therefrom are well known in the art and will not be discussed herein in detail. The preferred material for use in the present invention is ethylene acrylic acid copolymer because of low thermal activation temperatures for film bonding to other materials, and high surface tension for ink and coating adhesion.

The material for the other outer layer, the bottom layer, can be selected from the group consisting of copolymers of ethylene and an unsaturated carboxylic acid, especially ethylene acrylic acid copolymer for the reasons set forth above, copolymers of ethylene and propylene, copolymers of ethylene and vinyl acetate, and ionomers of ethylene and methacrylic acid. If it is desired to make a film construction which has good adhesive properties on both sides of the base layer, then the bottom layer should be a copolymer of ethylene and an unsaturated carboxylic acid. If it is desired to create a film construction which is heat sealable, then the bottom layer of the film construction can be any of the above materials because these materials are compatible with the biaxially oriented polypropylene base layer and provide good heat sealing properties.

The thickness of the layer or layers of the copolymer of ethylene and an unsaturated carboxylic acid can range from about 0.02 mils to about 0.08 mils except that the upper limit can be about 0.2 mils when the heat sealable film construction is made. If the thickness of the layer is less than about 0.02 mils, then the adhesive properties of the layer are not sufficient to provide good adhesion between the film construction and the metal or paper or whatever it is desired to bond it to. The layer is not thick enough to fill in the voids and there is uneven adhesion. Also, it is difficult to make such a thin layer. It is undesireable to make the layer thicker than the above limits because it can adversely affect the operability and the cost of the film construction.

The thickness of the layer of biaxially oriented polypropylene should generally fall in the range of 0.6 mils to 4 mils but thicker or thinner film constructions can be made as desired by changing the thickness of this layer. It is generally suitable that the thickness of the overall structure be from about 0.7 mils to about 4.5 mils. Within this range, the product manufactured is generally more suitable. Anything thicker is probably too costly. However, again, the thickness of the overall structure is not particularly important.

The film construction of the present invention can be manufactured by conventional flat sheet coextrusion cast in a water bath or on a special surface casting drum followed by orientation. Another method for making the film construction of the present invention comprises interdraw extrusion coating of the outer layers of the film construction onto the uniaxially oriented polypropylene core between the longitudinal and transverse orientation steps.

We claim:

1. A film construction formed by a one step thermal lamination process, comprising:

(a) A base layer of biaxially oriented polypropylene,
(b) A top layer of a copolymer of ethylene and an unsaturated carboxylic acid, and
(c) A bottom layer selected from the group consisting of copolymers of ethylene and an unsaturated carboxylic acid, copolymers of ethylene and propylene, copolymers of ethylene and vinyl acetate, and ionomers of ethylene and methacrylic acid, wherein one of the layers are coated with an adhesive material.

2. The film construction of claim 1 wherein the thickness of the layer of copolymer of ethylene and an unsaturated carboxylic acid is from about 0.02 mils to about 0.2 mils.

3. The film construction of claim 2 wherein said thickness is from about 0.02 mils to about 0.08 mils.

4. The film construction of claim 1 wherein the top layer is bonded to a metal layer.

5. The film construction of claim 4 wherein the bottom layer is a copolymer of ethylene and an unsaturated carboxylic acid and it is also bonded to a metal layer.

6. The film construction of claim 1 wherein the top layer is bonded to paper.

7. The film construction of claim 1 wherein the top layer is made of ethylene acrylic acid copolymer.

8. The film construction of claim 7 wherein the bottom layer is made of ethylene acrylic acid copolymer.

* * * * *

UNITED STATES PATENT AND TRADEMARK OFFICE
CERTIFICATE OF CORRECTION

PATENT NO. : 4,629,657
DATED : December 16, 1986
INVENTOR(S) : Gulati, et al.

It is certified that error appears in the above-identified patent and that said Letters Patent are hereby corrected as shown below:

In column 3, at line 9, "one" should read -- none --.

Signed and Sealed this

Ninth Day of February, 1988

Attest:

DONALD J. QUIGG

Attesting Officer

Commissioner of Patents and Trademarks